United States Patent [19]

Perkey

[11] Patent Number: 5,553,827
[45] Date of Patent: Sep. 10, 1996

[54] LOW CURRENT ELECTRO-HYDRAULIC METERING MODULE

[75] Inventor: Russell C. Perkey, Granger, Ind.

[73] Assignee: AlliedSignal Inc., Morristown, N.J.

[21] Appl. No.: 153,689

[22] Filed: Nov. 17, 1993

[51] Int. Cl.⁶ .............................................. F16K 31/124
[52] U.S. Cl. .................. 251/30.01; 137/625.63; 137/625.64
[58] Field of Search ................... 137/625.63, 625.64, 137/117; 251/30.01

[56] References Cited

U.S. PATENT DOCUMENTS

| | | | |
|---|---|---|---|
| 3,326,088 | 6/1967 | Hayner et al. | 137/625.62 X |
| 3,946,757 | 3/1976 | Wallace | 137/85 X |
| 4,040,599 | 8/1977 | Smith | 251/28 |
| 4,061,155 | 12/1977 | Sopha | 137/625.62 X |
| 4,202,171 | 5/1980 | Jurisch et al. | 137/625.63 X |
| 4,227,443 | 10/1980 | Toot | 137/625.64 X |
| 4,456,031 | 6/1984 | Taplin | 137/625.64 X |
| 5,174,339 | 12/1992 | Pickard | 137/625.64 X |
| 5,244,002 | 9/1993 | Frederick | 137/625.64 X |

*Primary Examiner*—Gerald A. Michalsky
*Attorney, Agent, or Firm*—Leo H. McCormick, Jr.; Larry J. Palguta

[57] ABSTRACT

A fluid flow control device of the type having a spool valve mechanically biased toward a neutral position, a movable fluidic control such as a jet pipe for selectively moving the spool valve from its neutral position, a torque motor movable from a neutral position in response to a driving signal for positioning the fluidic control, a sensor for sensing the position of the spool and providing an output signal indicative thereof, and electronic control circuitry including a feedback circuit which utilizes the sensor signal to selectively modify the torque motor driving signal includes a second feedback arrangement which responds to the position of the fluidic control to modify the spool position. The second feedback arrangement may take the form a resilient mechanical coupling between the spool and the fluidic control and is operable independently of the sensor and feedback circuit.

4 Claims, 3 Drawing Sheets

_(5,553,827)_

LOW CURRENT ELECTRO-HYDRAULIC METERING MODULE

BACKGROUND OF THE INVENTION

The present invention relates generally to flow control devices and more especially to a metering module including a torque motor, a valve actuable by the torque motor, and valve position sensor. Such a flow control device is well suited to fuel metering tasks, for example for aircraft engines.

Flow control failure in an aircraft engine can be catastrophic, hence, enhanced reliability is an ever present goal in systems of this type. The power consumption of such metering devices is also of continuing concern.

It would be highly desirable to provide a flow control device such as a fuel metering module or similar device which will provide a reasonable flow control despite loss of valve position feedback information and which operates with relatively low power requirements.

SUMMARY OF THE INVENTION

In general, a fluid flow control device of the type having a spool valve mechanically biased toward a neutral position, a movable fluidic control for selectively moving the spool valve from its neutral position, and a torque motor movable from a neutral position in response to a driving signal for positioning the fluidic control has a feedback arrangement including a resilient mechanical coupling between the spool and the fluidic control which responds to the position of the fluidic control for modifying the spool position. The fluid flow control device may be a two-stage, jet pipe electro-hydraulic servovalve and the torque motor may be a dual coil T-bar torque motor having an armature portion which extends from the motor to engage and position the jet pipe. Typically, the mechanical coupling takes the form of a spring engaging both the spool and the torque motor armature portion. The system may also include a sensor for sensing the position of the spool and providing an position indicative output signal, and an electrical feedback circuit responsive to the output signal for modifying the driving signal. The spool valve, fluidic control, torque motor, spring and sensor may all be contained within a common housing assembly.

Also in general and in one form of the invention, an improved fluid flow control device has a valve for metering the flow of a fluid, a fluidic control for controlling the valve, and an arrangement such as a jet pipe for controlling the fluidic control in response to a driving signal. The valve, fluidic control and means for controlling are all contained within a common housing assembly, and a feedback arrangement, also contained entirely within that common housing, responds to the condition of the valve to modify the condition of the jet pipe.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
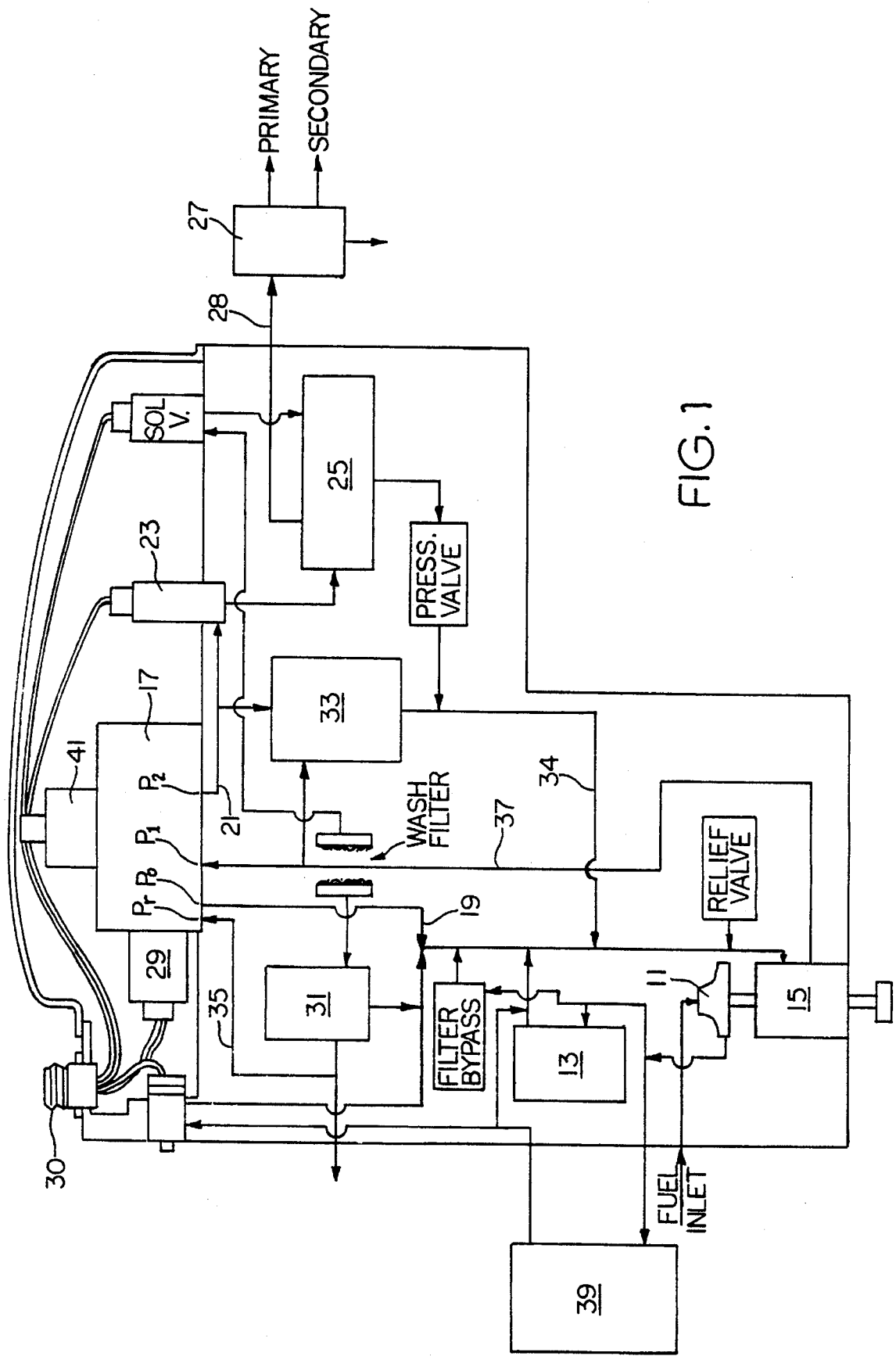
FIG. 1 is a block diagram of a fuel supply system incorporating the metering valve of the present invention in one form.

In FIG. 1, a fuel metering system as might be employed to supply fuel to an aircraft engine is shown generally. The system includes a fuel supply inlet connected to a first pump 11 which circulates fuel through the filter 13 and back to a second pump 15. The output of pump 15 is supplied to the fuel metering valve or servovalve 17, for example, a two stage jet pipe electro-hydraulic servovalve about which more will be said later. Servovalve 17 establishes a fuel flow metering area 67, see FIG. 4, determined by command signals and feedback signals. Output line 21 supplies the fuel by way of a temperature sensor 23 and a pressure and shut-off valve 25 to a flow division valve 27 for utilization by the engine. The position of the servovalve 17 which reflects the metering area 67 is monitored by a sensor such as the linear variable differential transformer 29. A spring biased motive flow pressure regulator 31 maintains a constant pressure differential between lines 35 and 19 by throttling the flow from pump 15 in line 37. A differential pressure regulator or bypass valve 33 maintains a constant pressure differential between lines 37 and 21. Valve 33 may be a double ported popper valve actuated by a spring loaded diaphragm which senses both pressures, one on each side of the diaphragm. When the pressure differential exceeds the spring setting, the valve 33 opens dumping fuel from line 37 back to line 19 via line 34 which returns excess fuel flowback to pump 15 inlet. An electrical circuit 30 is connected to an electronic controller which is responsive to an output signal from sensor 29 to modifying the driving signal supplied to torque motor 41. The fuel metering system of FIG. 1 as thus far described is, except for the servovalve 17, relatively conventional.

Figure 2:
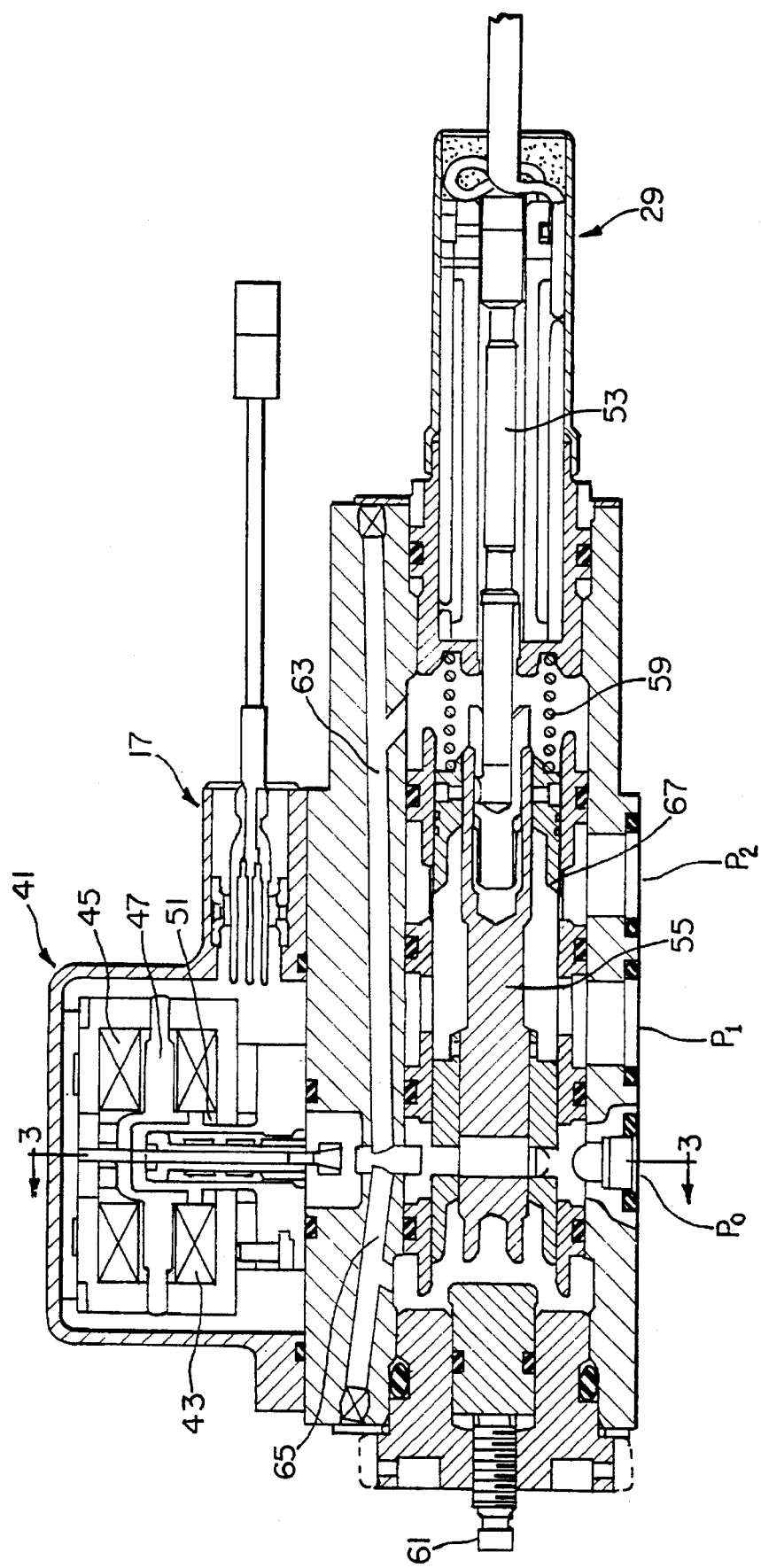
FIG. 2 is a cross-sectional view of an implementation of the electro-hydraulic metering valve and valve position sensor of FIG. 1.
Figure 3:
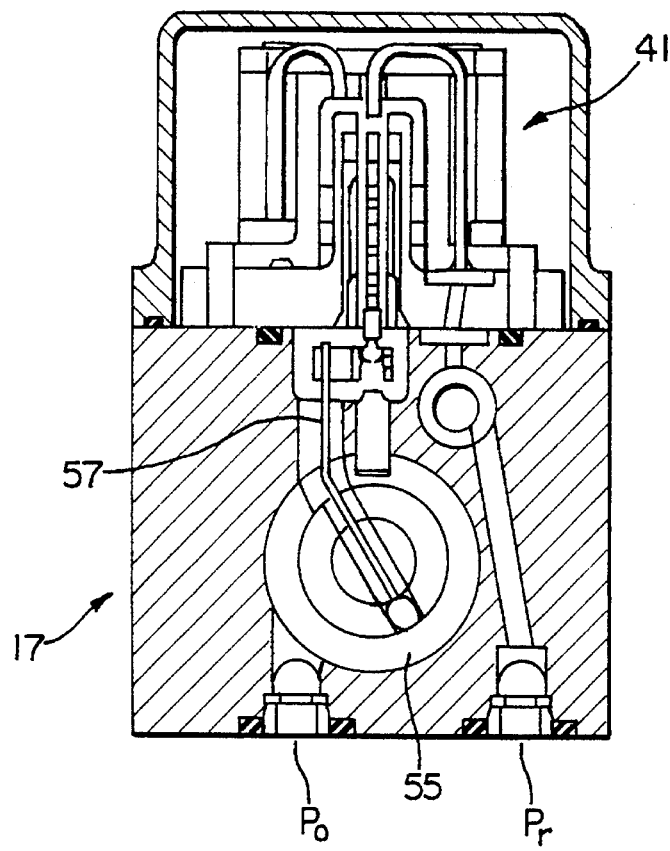
FIG. 3 is a cross-sectional view along section lines 3—3 of FIG. 2.
Figure 4:
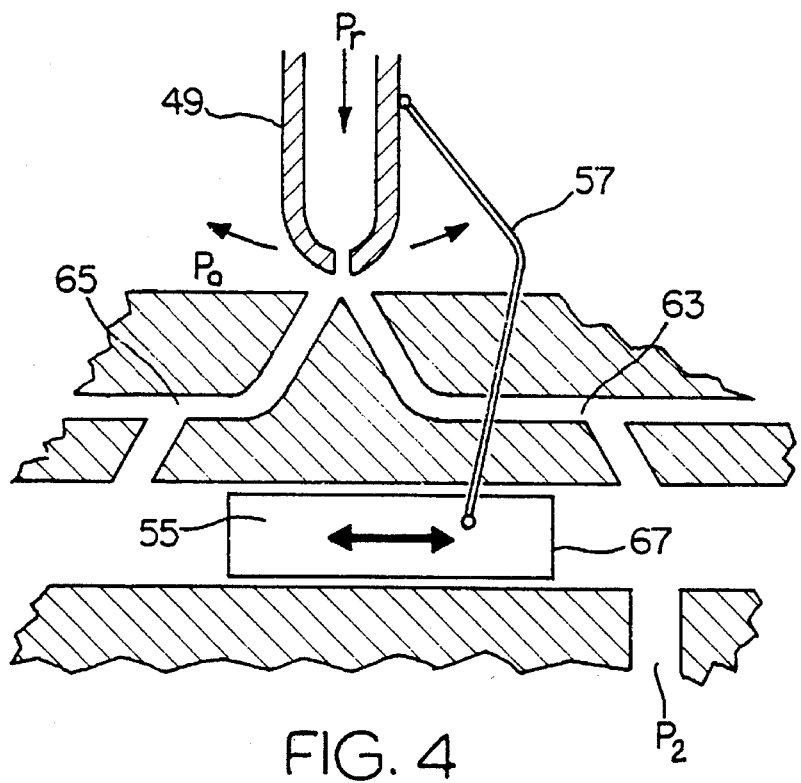
FIG. 4 is a simplified illustration showing the coupling between the spool and torque motor armature.

FIG. 2 shows a cross-sectional view of the fuel metering valve (servovalve) 17. Valve 17 includes a torque motor portion 41 and a sensor portion 29. As seen in FIGS. 2 and 3, the spool valve 55, jet pipe fluidic control, sensor 29, and torque motor 41 which controls the position of the jet pipe are all contained within a common housing assembly. The torque motor portion 41 is illustrated as a dual coil (43 and 45) T-bar (47) torque motor which operates within a permanent magnet stator and provides power for pivoting an armature which includes the T-bar 47 as well as the downwardly depending portion 49. Preferably, the motor windings or coils 43 and 45 surrounding the two legs of the T-bar are independently energizable, thus adding reliability should one coil fail. The armature is supported on twin cantilever springs and pivots about a axis which passes through a seal 51. This seal provides isolation between the fuel and the torque motor. The spool 55 of the valve is mechanically biased toward a neutral or minimum flow position by spring 59. The minimum flow position is adjustable by turning minimum flow abutment adjustment screw 61. The lower armature portion 49 of torque motor 41 includes a jet pipe from which regulated pressurized fuel emanates. This pressurized fuel is supplied by line 35 in FIG. 1 and is identified as $P_r$ in FIGS. 3 and 4. Thus, the armature portion 49 behaves like a jet pipe or nozzle. As best seen in FIG. 4, the flow from this nozzle is distributed between conduits 63 and 65 in a proportion determined by the nozzle position. This position is determined by the current supplied to the torque motor 41. Increased flow to conduit 63 increases pressure on the right side of spool 55 moving it toward the left while an increase in flow to conduit 65 increases the pressure on the left side of the spool causing it to move rightward. Fuel is supplied on line 37 of FIG. 1 to the port $P_1$ and exits from port $P_2$ on line 21 to be supplied to the engine. The position of metering area 67 of spool 55 determines area for flow from port $P_2$ with the remaining flow exiting from the bypass valve 33 to line 19 via line 34. Thus, the jet pipe functions as a movable fluidic control for selectively moving the spool 55 from its neutral position.

As best seen in FIGS. 3 and 4, there is a resilient mechanical coupling such as spring 57 which provides a mechanical feedback from the spool 55 to the jet pipe. Were it not for the fact that the spool valve and torque motor share a common housing, such independent mechanical feedback would be more complex. Spring 57 is responsive to the position of spool valve 55 and operates quite independently of the electrical feedback circuit 30. The torque motor 41 is of a type disclosed in U.S. patent application Ser. No. 08/134,770, U.S. Pat. No. 5,465,757, which produces torque in the T-bar 47 proportional to current supplied to coils 43 or 45. The twin cantilever springs allow full deflection of the T-bar armature 47 and portion 49 against mechanical stops with only two percent of maximum current. This results in full fuel pressure thru either conduit 63 or 65 of driving spool 55. For example, movement of the jet pipe 49 in FIG. 4 to the right increases fuel pressure in conduit 63 while venting conduit 65 to line 19 which is connected to pump 15 inlet. Thus, full fuel pressure differential $(P_R-P_O)$ can be applied to spool 55 if such force is required. As spool 55 moves in response to the differential pressure, the force from feedback spring 57 increases to restore T-bar armature 47 and portion 49 to its neutral or centered position which in turn eliminates the pressure differential on spool 55. A similar moderating of the control occurs for leftward motion (decreased engine fuel flow) of portion 49.

By designing feedback spring 57 such as to match its restoring torque to torque motor 41 output torque, spool 55 position is directly related to torque motor 41 input current which allows controlled metering area independent of electrical feedback.

The position sensor 29 includes a high permeability, soft metallic core 53 which is coupled to and moves with a spool 55. Motion of this metallic core varies the coupling between an excitation coil and a sensing coil within sensor 29. There may be two sensing coils with the excitation coil and two sensing coils symmetrically positioned about the core 53. With a standard alternating current signal applied to the excitation coil, each of the sensing coils provides a spool position indicative output signal. Should a sensor failure occur, the system continues to operate in a mechanically closed-loop mode with spring 57 providing feedback from the spool to the motor armature. System performance is superior to similar systems which, upon electronic feedback failure, would operate in an open-loop mode without practical control of metering valve position.

What is claimed is:

1. In a fluid flow control device having a housing with a bore therein for retaining a spool valve, said housing having an inlet port connected to a first source of fluid having a constant fluid pressure, an outlet port connected to a fuel supply system and a return port connected to a storage reservoir, adjustment means connected to said housing and extending into said bore, a spring for urging said spool valve into engagement with said adjustment means to define a metering area between said housing and said spool valve to assure that a minimum volume of fluid is communicated from said first source to said system through said outlet port, a torque motor located in said housing and responsive to a driving signal for moving from a neutral position to a desired operational position, a movable fluidic control directly connected to said torque motor and fluidicly connected to said spool valve, said movable control moving with said torque motor for communicating a second source of pressurized fluid to said bore, said second source of pressurized fluid acting on said spool valve and after overcoming said spring moving said spool valve to change said metering area and divide the quantity of said first source of pressurized fluid supplied to said inlet port into a supply fluid and a return fluid, said supply fluid being supplied to said system through said outlet port while said return fluid is returned to said reservoir, first feedback means including a sensor for sensing the position of the spool valve and providing an output signal indicative thereof to a controller, and an electrical feedback circuit responsive to said output signal for modifying said driving signal, the improvement comprising second feedback means including a single resilient mechanical coupling responsive to the position of the spool valve for independently positioning said fluidic control as a function of the position of said spool valve such that a minimum flow of pressurized fluid from said first source occurs through said outlet port when said spool valve engages said adjustment means.

2. The improvement of claim 1 wherein torque motor is a dual coil T-bar torque motor having an armature portion which extends from the motor to engage and position the fluidic control.

3. The improvement of claim 1 wherein the fluid flow control device is a two-stage, jet pipe electro-hydraulic servovalve and said mechanical coupling comprises a spring engaging both the spool and said armature portion of said torque motor.

4. The improvement of claim 1 wherein said first feedback means includes an electrical feedback circuit responsive to the output signal for modifying the driving signal supplied to said torque motor, and where the improvement further comprising a common housing assembly for retaining said spool valve, fluidic control, torque motor, spring and sensor.

* * * * *